United States Patent [19]

Spowart

[11] Patent Number: 4,975,583

[45] Date of Patent: Dec. 4, 1990

[54] METHOD AND APPARATUS FOR DETECTING RADIOISOTOPES IN FLUIDS

[76] Inventor: Alexander R. Spowart, Sandbank Road, Sandbank, Argyll, Great Britain, PA23 8PW

[21] Appl. No.: 382,699

[22] PCT Filed: Feb. 18, 1988

[86] PCT No.: PCT/GB88/00099
§ 371 Date: Aug. 7, 1989
§ 102(e) Date: Aug. 7, 1989

[87] PCT Pub. No.: WO88/06297
PCT Pub. Date: Aug. 25, 1988

[30] Foreign Application Priority Data

Feb. 21, 1987 [GB] United Kingdom ............... 8704074

[51] Int. Cl.$^5$ .............................................. G01T 1/20
[52] U.S. Cl. .................................... 250/364; 250/368
[58] Field of Search ............................... 250/368, 364

[56] References Cited

U.S. PATENT DOCUMENTS 3,169,187  2/1965  Stone et al. ..................... 250/364
4,598,202  7/1986  Koechner ........................ 250/368

FOREIGN PATENT DOCUMENTS 128179  10/1980  Japan ................................ 250/364
72376   6/1981   Japan ................................ 250/364
876237  8/1961   United Kingdom ............... 250/364
921491  3/1963   United Kingdom ............... 250/364

OTHER PUBLICATIONS

Engstrom,"Improvements in Photomultiplier and TV Camera Tubes for Nuclear Medicine", IEEE Trans. Nucl. Sci, NS-24 (2), Apr. 1977, pp. 900–903.

Sansom et al, "A Simple Device for the Scintillation Counting of Aqueous Solutions of Calcium–45 and Other β-Emitting Isotopes", Nature, vol. 211, Aug. 6, 1966, p. 626.

Vol. 16, No. 9 of IBM Technical Disclosure Bulletin of Feb. 1974, entitled "Image Intensifier", R. W. Dreyfus.

Primary Examiner—Carolyn E. Fields
Attorney, Agent, or Firm—Mason, Fenwick & Lawrence

[57] ABSTRACT

An apparatus for detecting radioisotopes in fluids (e.g., in gas/liquid chromatography) comprises a bundle of scintillating optical fibres 12 extending along the interior of a conduit 10 through which a fluid may flow. The bundle of scintillating optical fibres has ends 14, 16 passing through the side of the conduit 10 to connect with light detecting means 18, 20. Other embodiments and methods of use are disclosed.

19 Claims, 1 Drawing Sheet

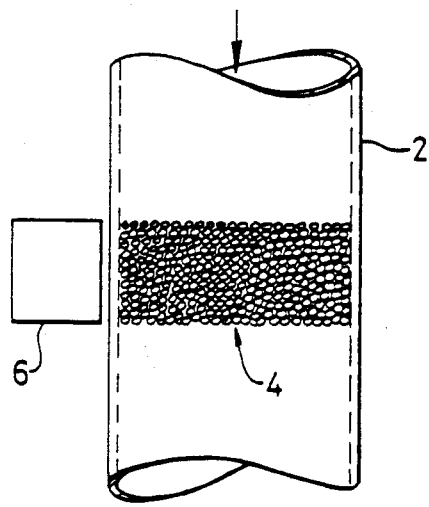
Fig. 1
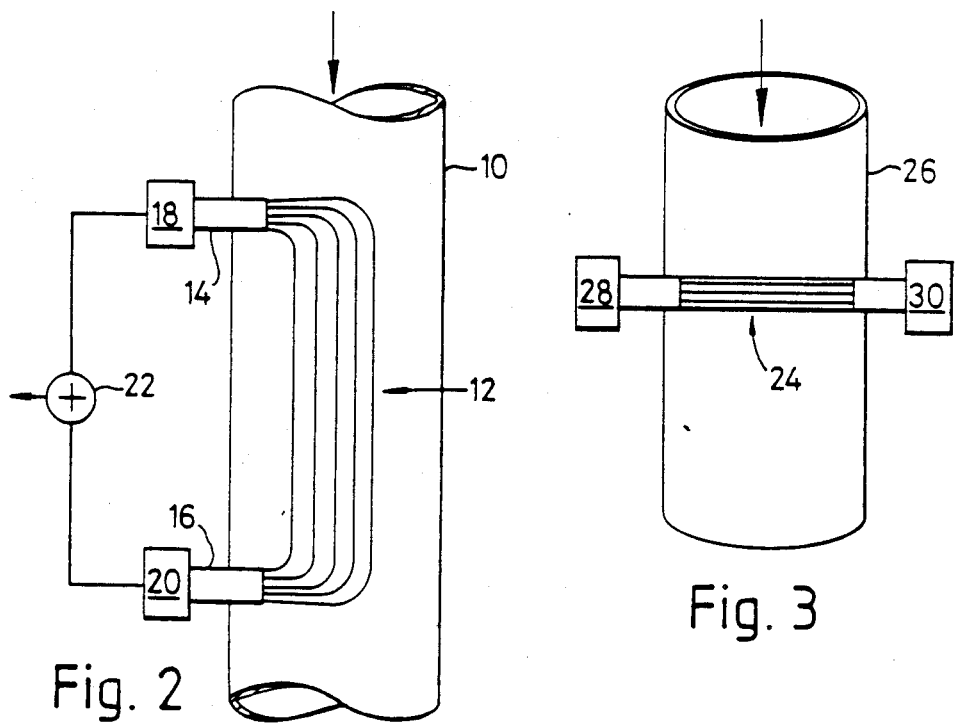
Fig. 2
Fig. 3

METHOD AND APPARATUS FOR DETECTING RADIOISOTOPES IN FLUIDS

DESCRIPTION

The present invention relate$ to the detection of radioisotopes in fluids and is applicable, for example, to any requirement for measuring the time of arrival of a radioactively labelled slug of fluid at a fixed point in a system.

Such a requirement exists in the field of gas/liquid chromatography and FIG. 1 schematically illustrates a conventional radioisotope detection technique employed in known chromatography columns. Such columns are widely used to analyse radioisotope-labelled molecules (such as proteins) contained in a liquid carrier flow on the basis of their time of transit down a long narrow conduit 2. After transit down the conduit 2 the different molecular species arrive at a detector zone 4 at different times where they are monitored by a scintillation counting technique. In known columns the detector zone 4 comprises a packed powder of crystalline phosphor (commonly P47 $Ce^{3+}$ doped yttrium silicate) or powdered scintillating glass (i.e. glass doped with scintillating material). The light output from the detector zone 4 is monitored through the glass wall of the conduit 2 by a photomultiplier 6 or the like. Disadvantages associated with this technique are, firstly, that the powder packing density and powder particle size distribution are limited by the need to avoid clogging up the column or creating a back pressure and, secondly, that much of the emitted light from the detector zone 4 is lost by internal scatter and self-absorption within the powder or glass grains, so reducing the sensitivity of the apparatus.

It is an object of the present invention to obviate or mitigate the aforesaid disadvantages.

According to a first aspect, the invention provides a method of detecting radioisotopes contained within a fluid, wherein at least one scintillating optical fibre is immersed within said fluid and the light emitted from at least one end of said fibre is monitored by light detecting means.

Preferably, a plurality of fibres is used and the light emitted from each end of the fibres is monitored.

Preferably also, the diameter of the fibres is selected according to the type and energy of radiation emitted from the radioisotope being used and the scintillating material with which the fibres are doped is selected to suit the spectral characteristics of the light detecting means. The fibres are preferably also unclad.

The fluid is preferably also flowed past the fibres and fibres are preferably oriented either substantially along the direction of flow of the fluid or transversely to said direction of flow.

Preferably also, light detecting means are provided at either end of the fibres. The outputs from the light detecting means may be summed to give an output of amplitude proportional to the amount of radioactivity in contact with the fibres, or, in the case where the fibres are oriented transversely to the direction of fluid flow, the outputs from the light detecting means are used to determine the transverse position from which a pulse of light is emitted.

According to a second aspect, the invention provides an apparatus for detecting radioisotopes contained within a fluid comprising at least one scintillating optical fibre having at least one end thereof coupled to light detecting means.

Preferably, said apparatus includes a plurality of fibres coupled to said light detecting means.

Preferably also, both ends of said fibres are coupled to light detecting means.

Alternatively, one end of said fibres is coupled to light detecting means and the other end thereof is mirrored.

Preferably also, said fibres are unclad and the ends thereof are fused together.

Preferably also, the outputs from said light-detecting means are connected to summing means.

Preferably also, said fibres are located within a conduit along which said fluid is flowed, the ends of said fibres passing through the walls of the conduit and coupled to said light detecting means externally thereof.

Preferably also, the fibres within said conduit are oriented substantially along the direction of fluid flow. Alternatively, the fibres are oriented substantially transversely to said direction of fluid flow.

Embodiments of the invention will now be described, by way of example only, with reference to the accompanying drawings, in which:

FIG. 2 is a schematic drawing of apparatus embodying the present invention; and

FIG. 3 is a schematic drawing of an alternative embodiment of the invention.

Referring now to FIG. 2, a carrier fluid containing radioisotopes is passed along a conduit 10 which might form part of a chromatography column or the like, past detector means comprising a bundle of optical fibres 12 doped with scintillating material. The bundle of fibres 12 extends along part of the length of the conduit 10 and the ends 14, 16 thereof pass through the wall of the conduit 10 and are coupled to light detecting means such as photomultipliers 18, 20 using optical coupling fluid. The ends 14, 16 of the bundle 12 are preferably fused together to simplify installation in the wall of the conduit 10 and to eliminate leakage problems. The electrical output signals from the photomultipliers 18, 20 may be combined by a summation amplifier 22. Thus, as a slug of fluid containing radioisotopes passes the bundle of fibres 12, the radiation emitted therefrom will enter the fibres 12 and cause the scintillating material to fluoresce. The light thus emitted will be channeled along the fibres 12 to the photomultipliers 18, 20 so that the output from the summation amplifier 22 will be directly proportional to the radioactivity of the fluid instantaneously in contact with the fibres 12.

Optical fibres are normally clad with a layer of material of lower refractive index than the fibre itself in order to ensure total internal reflection of the light passing along the fibre. In the present application, however, the refractive index of the fluid in contact with the fibres 12 will always be less than that of the fibres 12. For this reason total internal reflection of the light emitted within the fibres 12 will occur in any case, so that the usual cladding may be omitted. This is particularly desirable in the case of low-energy radioactive labelling isotopes such as carbon - 14 (decay energy: 0.156 MeV) or tritium - 3 (decay energy: 0.018 MeV) since any cladding would absorb most of the radiation before reaching the scintillating material of the fibres 12, thereby reducing the sensitivity of the detector. Fibres for use with radioisotopes of higher energy, above, say, 0.5 MeV (such as phosphorus - 32 decay energy: 1.710

MeV), may be clad if desired since proportionately little energy loss will occur in the cladding.

The provision of a photomultiplier 18, 20 at each end of the bundle 12 ensures that all of the light emitted within the fibres is collected and so the sensitivity of the detector maximised. One of the photomultipliers 18, 20 could, however, be omitted, and those ends of the fibres 12 mirrored.

In the embodiment of FIG. 2, the orientation of the fibres 12 along the length of the conduit 10 provides high sensitivity to low levels of radiation, since a given slug of fluid will be in contact with the fibres 12 over an extended period of time, however the positional resolution along the axis of the conduit 10 will be relatively poor. FIG. 3 shows an alternative configuration wherein the fibres 24 are arranged in a transverse plane across the conduit 26. In this case the positional resolution of the system will be enhanced but its sensitivity will be relatively poorer. Numerous other configurations are, of course, possible including helical arrangements, lattices etc.

The detectors of FIGS. 2 and 3 may be applied advantageously in chromatographic analysis, replacing the packed powder of FIG. 1. Sensitivity is improved since all the light emitted in the fibres is coupled to the external detectors so that losses by scattering and absorption are eliminated. Additionally, there is intimate contact between the fluid and the fibres and there is minimal disturbance of the fluid flow along the conduit. The creation of back pressure in the conduit is also avoided.

The scintillating material with which the fibres are doped may be selected to emit in the spectral bands best suited to the characteristics of the external photodetectors. For example, cerium$^{3+}$ will emit in the blue, terbium$^{3+}$ in the yellow and europium$^{3+}$ in the red. The diameter of the fibres themselves may also be selected according to the type and energy of the radiation emitted from the particular radioactive label to be used in order to ensure that substantially all the radiation is absorbed within the fibre. For example, with the beta-emitting radioisotope phosphorus-32 a diameter of approximately 1 mm will give virtually 100% absorption.

The present technique is applicable to any requirement for measuring the time of arrival of a radioactively labelled slug of fluid at a fixed point in a system, gas/liquid chromatography merely being an example of one such application. The transverse arrangement of the fibres 24 in FIG. 2 having photomultipliers 28, 30 at either end thereof might also be used to monitor the transverse position of a labelled slug of fluid arriving at the detector using any suitable technique such as time-amplitude-conversion since light emitted from a point along the length of the fibres 24 will arrive at the opposite ends thereof at different times. Such an arrangement might thus be used in flow-profile analysis currently requiring complex and expensive laser anemometry techniques.

The fibres themselves would normally be of glass which is resistant to chemical attack in fluids other than hydrofluoric acid and will withstand temperatures of at least 300° C. Fibres formed from plastics materials may also be used in some applications, but their suitability is limited by their poorer resistance to heat and chemical attack, lower refractive index and generally poor optical qualities. The evolution of gases from plastics materials may also be undesirable in ultra-clean systems.

The invention thus provides a method and apparatus for detecting radioisotopes in fluids having significant advantages over existing techniques as noted above. The scintillating materials from which the fibres are formed will detect all forms of radioactive labelling including alpha, beta and gamma radiation, X-rays and neutrons. They also offer the potential for a high count rate capability; for example, the decay time of a luminescent pulse from cerium$^{3+}$ is 200 nanoseconds so that the potential count rate is $1/(200 \times 10^{-9})$ seconds$^{-1}$ or 5 MHz.

I claim:

1. A method of detecting radioiosotopes contained within a fluid flowing through an elongate conduit wherein at least one scintillating optical fibre is located within said conduit, immersed within said fluid and the light emitted from at least one end of said at least one fibre is monitored by light detecting means, said at lest one end of said at least one fibre passing through a wall of said conduit and said at least one end being coupled to said light detecting means externally of said conduit, such that the flow of fluid along said conduit is substantially undisturbed by said at least one fibre.

2. A method as claimed in claim 1 wherein a plurality of fibres is immersed in said fluid.

3. A method as claimed in claim 1 wherein the light emitted from each end of said at least one fibre is monitored by light detecting means external to said conduit.

4. A method as claimed in claim 1 wherein the diameter of said at least one fibre is selected according to the type and energy of radiation emitted from the radioisotope being used such that substantially all of the radiation is absorbed within said at least one fibre.

5. A method as claimed in claim 1 wherein the scintillating material with which said at least one fibre is doped is selected to suit the spectral characteristics of the light detecting means.

6. A method as claimed in claim 1 wherein said at least one fibre is unclad.

7. A method as claimed in claim 1 wherein said at least one fibre is oriented substantially along the direction of flow of said fluid.

8. A method as claimed in claim 1 wherein said at least one fibre is oriented substantially transversely to the direction of flow of said fluid.

9. A method as claimed in claim 8 wherein light detecting means are provided at either end of said at least one transversely oriented fibre and wherein the outputs of said light detecting means are used to determine the transverse position from which a pulse of light is emitted.

10. A method as claimed in claim 1 wherein light detecting means are provided at either end of said at least one fibre and wherein the outputs of said light detecting means are summed to give an output of amplitude proportional to the amount o radioactivity in contact with said at lest one fibre.

11. Apparatus for detecting radioisotopes contained within a fluid flowing through an elongate conduit, comprising at least one scintillating optical fibre located within said conduit, at least one end of said at least one fibre passing through a wall of said conduit and being coupled to light detecting means external to said conduit.

12. Apparatus as claimed in claim 11 including a plurality of fibres coupled to said light detecting means.

13. Apparatus as claimed in claim 12 wherein the ends of said fibres are fused together.

14. Apparatus as claimed in claim 11 wherein both ends of said at least one fibre pass through a wall of said conduit and are coupled to light detecting means externally of said conduit.

15. Apparatus as claimed in claim 11 wherein one end of said at least one fibre is coupled to light detecting mans and the other end thereof is mirrored.

16. Apparatus as claimed in any of claims 11 to 15 wherein said at least one fibre is unclad.

17. Apparatus as claimed in claim 14 wherein the outputs from said light-detecting means are connected to summing means.

18. Apparatus as claimed in claim 11 wherein said at lest one fibre within the conduit is oriented substantially along the direction of fluid flow substantially along the direction of fluid flow.

19. Apparatus as claimed in claim 11 wherein said at least one fibre within the conduit is oriented substantially transversely to the direction of fluid flow.

* * * * *